United States Patent
Nishida et al.

(10) Patent No.: US 9,708,022 B2
(45) Date of Patent: Jul. 18, 2017

(54) FUEL TANK MOUNTING STRUCTURE OF SADDLE-RIDE-TYPE VEHICLE

(71) Applicant: HONDA MOTOR CO., LTD., Tokyo (JP)

(72) Inventors: Yoichi Nishida, Wako (JP); Mitsuya Kawamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 372 days.

(21) Appl. No.: 14/468,670

(22) Filed: Aug. 26, 2014

(65) Prior Publication Data
US 2015/0061276 A1 Mar. 5, 2015

(30) Foreign Application Priority Data

Aug. 30, 2013 (JP) .................................. 2013-180732

(51) Int. Cl.
*B62J 35/00* (2006.01)
*F02M 37/10* (2006.01)
*B62K 19/30* (2006.01)

(52) U.S. Cl.
CPC .............. *B62J 35/00* (2013.01); *B62K 19/30* (2013.01); *F02M 37/103* (2013.01)

(58) Field of Classification Search
CPC ....... B62J 35/00; F02M 37/103; B62K 19/30; A01B 12/006
See application file for complete search history.

(56) References Cited

U.S. PATENT DOCUMENTS

| | | | | | |
|---|---|---|---|---|---|
| 5,791,431 | A | * | 8/1998 | Asao | B62K 5/01 180/311 |
| 6,651,764 | B2 | * | 11/2003 | Fournier | B62M 27/02 180/182 |
| 7,422,243 | B2 | * | 9/2008 | Kudo | F02B 61/02 123/509 |
| 7,992,901 | B2 | * | 8/2011 | Hirano | B62J 35/00 280/833 |
| 2005/0029032 | A1 | * | 2/2005 | Kudo | B62M 7/00 180/219 |
| 2011/0204613 | A1 | * | 8/2011 | Aoki | B62J 35/00 280/830 |
| 2012/0060799 | A1 | * | 3/2012 | Wakabayashi | F02M 37/007 123/495 |

FOREIGN PATENT DOCUMENTS

| | | | |
|---|---|---|---|
| JP | 62-076791 U | * | 5/1987 |
| JP | 2999149 | | 11/1999 |
| JP | 2007001494 A | * | 1/2007 |

* cited by examiner

*Primary Examiner* — Joseph Rocca
*Assistant Examiner* — Daniel Yeagley
(74) *Attorney, Agent, or Firm* — Rankin, Hill & Clark LLP

(57) ABSTRACT

A pump mounting seat surface is formed on a rear lower portion of a fuel tank. An approximately strip-shaped tank rear stay is mounted such that the tank rear stay escapes a pump mounting seat of the pump mounting seat surface. Both ends of the tank rear stay in the longitudinal direction project outward from the rear lower portion as mounting end portions. The mounting end portions are made to overlap with tank rear mounting bosses formed on center frames, and are fastened to the tank rear mounting bosses by bolts from above. A mounting member is not arranged below the pump mounting seat surface and hence, it is possible to ensure a space for a pipe of a fuel pump.

18 Claims, 8 Drawing Sheets

FUEL TANK MOUNTING STRUCTURE OF SADDLE-RIDE-TYPE VEHICLE

BACKGROUND OF THE INVENTION

Field of the Invention

The present invention relates to a fuel tank mounting structure of a saddle-ride-type vehicle, and more particularly to a mounting structure for mounting a rear side of a fuel tank.

Description of Related Art

There has been known a fuel tank mounting structure where a fuel tank is supported on a main frame which constitutes a vehicle body frame, brackets which project rearward are formed on a rear end portion of the fuel tank, the brackets are made to overlap with a cross member which extends between a pair of left and right vehicle body frames, and the brackets are fastened to the cross member by bolts from above (see Japanese Patent No. 2999149).

With respect to a saddle-ride-type vehicle, there has been known a structure where a buffer for a rear wheel suspension is supported on a cross member which extend between left and right vehicle body frames behind a fuel tank. However, to consider the case where such buffer supporting structure is adopted, when the support structure of the rear end portion of the fuel tank disclosed in the above-mentioned Japanese Patent No. 2999149 is also adopted, the cross member for supporting the fuel tank and the cross member for supporting the buffer are separately provided thus giving rise to a possibility that the vehicle body frames cannot acquire appropriate rigidity.

On the other hand, for supporting a rear end portion of a fuel tank, there has been proposed the structure where a cross member is not used, a shaft (bolt) extends between vehicle body frames instead of the cross member, and the rear end portion of the fuel tank is mounted on the shaft. In this case, however, when a type of fuel tank is adopted where a fuel pump is incorporated into the fuel tank and the fuel pump is mounted on a bottom surface of a rear portion of the fuel tank, there may be a case where the presence of the shaft impedes the mounting of the fuel pump on the bottom surface of the rear portion of the fuel tank or the arrangement of a fuel pump pipe below the bottom surface of the rear portion of the fuel tank. The present invention has been made to overcome these drawbacks.

SUMMARY OF THE INVENTION

To overcome the above-mentioned drawbacks, the present invention provides a fuel tank mounting structure of a saddle-ride-type vehicle which includes: a vehicle body frame having a head pipe that steerably supports a front wheel, left and right main frames extending obliquely downward and rearward from the head pipe, and left and right center frames extending downward from rear ends of the left and right main frames; a fuel tank supported on the main frame; and a seat arranged behind the fuel tank, wherein the fuel tank is arranged in an elongated manner in the longitudinal direction of the vehicle, the fuel tank is mounted on the vehicle body frame by a front side connecting member and a rear side connecting member, the rear side connecting member extends leftward and rightward in the vehicle width direction from a bottom surface of a lower portion of a rear portion of the fuel tank, and end portions of the rear side connecting member in the lateral direction are mounted on the left and right main frames or the left and right center frames. Accordingly, it is unnecessary to provide a cross member or a shaft which has been conventionally provided only for mounting a fuel tank. As a result, even when a cross member for supporting a buffer is provided, the vehicle body frame can acquire appropriate rigidity. Further, even when the fuel pump is incorporated into the fuel tank and the fuel pump is mounted on the bottom surface of the lower portion of the rear side of the fuel tank, there is no mounting member such as a shaft below the bottom surface of the rear lower portion of the fuel tank and hence, the mounting of the fuel pump and the arrangement of a fuel pump pipe below the bottom surface of the rear lower portion of the fuel tank are facilitated.

In further accordance with the present invention, the rear side connecting member projects to the outside of the fuel tank as viewed in a top plan view of the vehicle, and the rear side connecting member is made to overlap with and is fastened to upper surfaces of the left and right main frames or upper surfaces of the left and right center frames from above. Accordingly, in mounting or removing the fuel tank, it is unnecessary for an operator to bend over or to look into the fuel tank. Further, a length of a fastening member can be shortened and hence, the fastening is also simplified whereby the operability of the fastening operation is enhanced.

In further accordance with the present invention, the rear side connecting member is a laterally integral part which is fixedly mounted on the bottom surface of a lower portion of a rear portion of the fuel tank. Hence, strength of the rear side connecting member can be enhanced.

In further accordance with the present invention, a pump mounting seat surface for mounting a fuel pump thereon is formed on a rear portion of the bottom surface of the fuel tank, and the rear side connecting member extends in such a manner that the rear side connecting member is routed around a rear side of the pump mounting seat. Hence, the rear side connecting member can reinforce the pump mounting seat.

In further accordance with the present invention, the fuel tank mounting structure of a saddle-ride-type vehicle further includes: a vehicle body cover that covers a side surface of the vehicle body in such a manner that the vehicle body cover extends from a lower edge of the seat to a lower edge of the fuel tank, and the lower edge of the seat and the lower edge of the fuel tank are connected to an upper edge of the vehicle body frame by a downwardly spreading surface. Hence, the vehicle body cover can cover the mounting portion of the rear side connecting member whereby the appearance of the vehicle can be enhanced.

In further accordance with the present invention, the vehicle body cover engages with a side surface of the fuel tank in the vicinity of the rear side connecting member. Hence, the vehicle body cover is hardly deformed even when the vehicle body frame is gripped by legs of a rider.

DETAILED DESCRIPTION OF THE INVENTION

Figure 1:
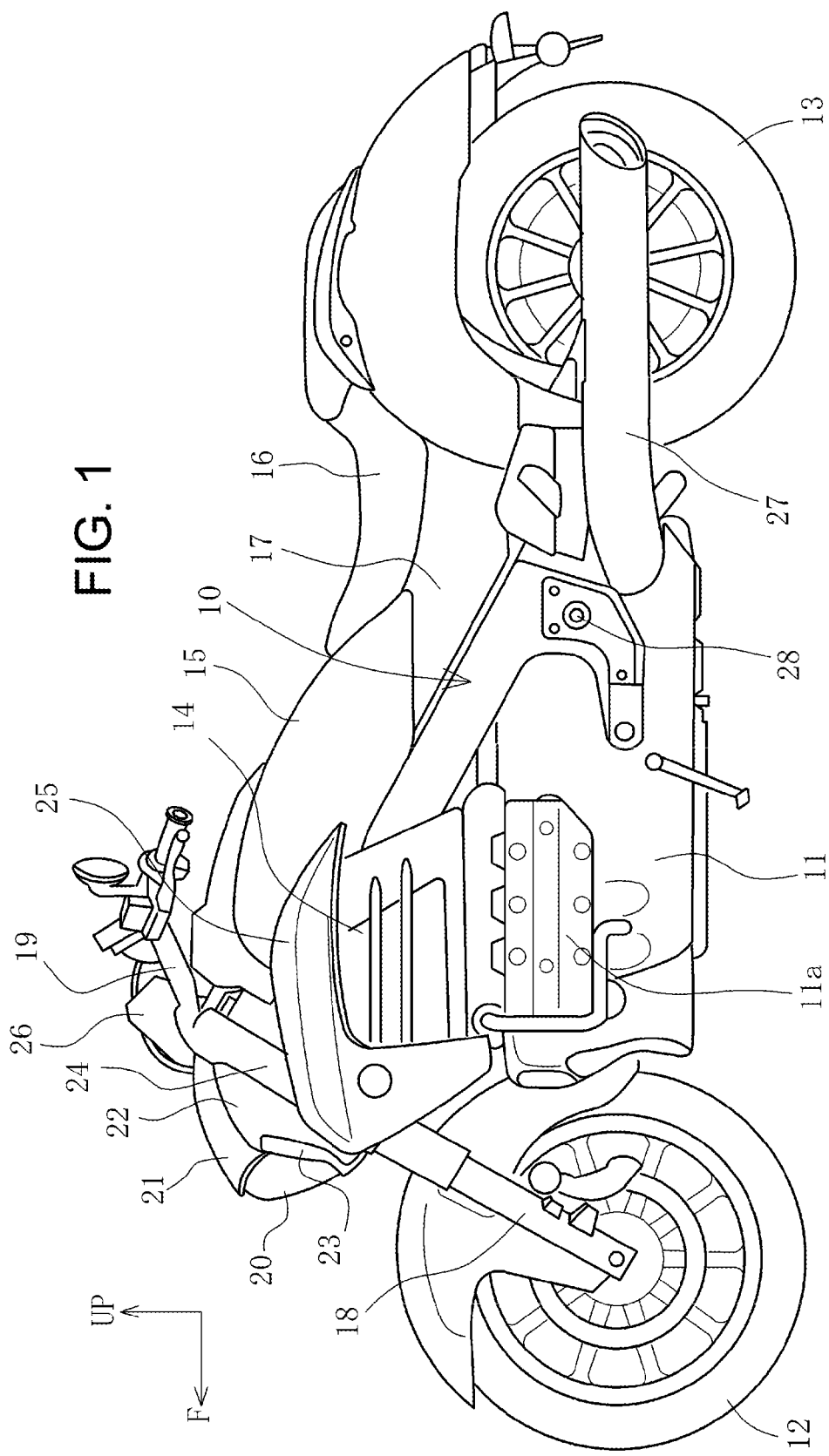
FIG. 1 is a left side view of a vehicle according to an embodiment.
Figure 2:
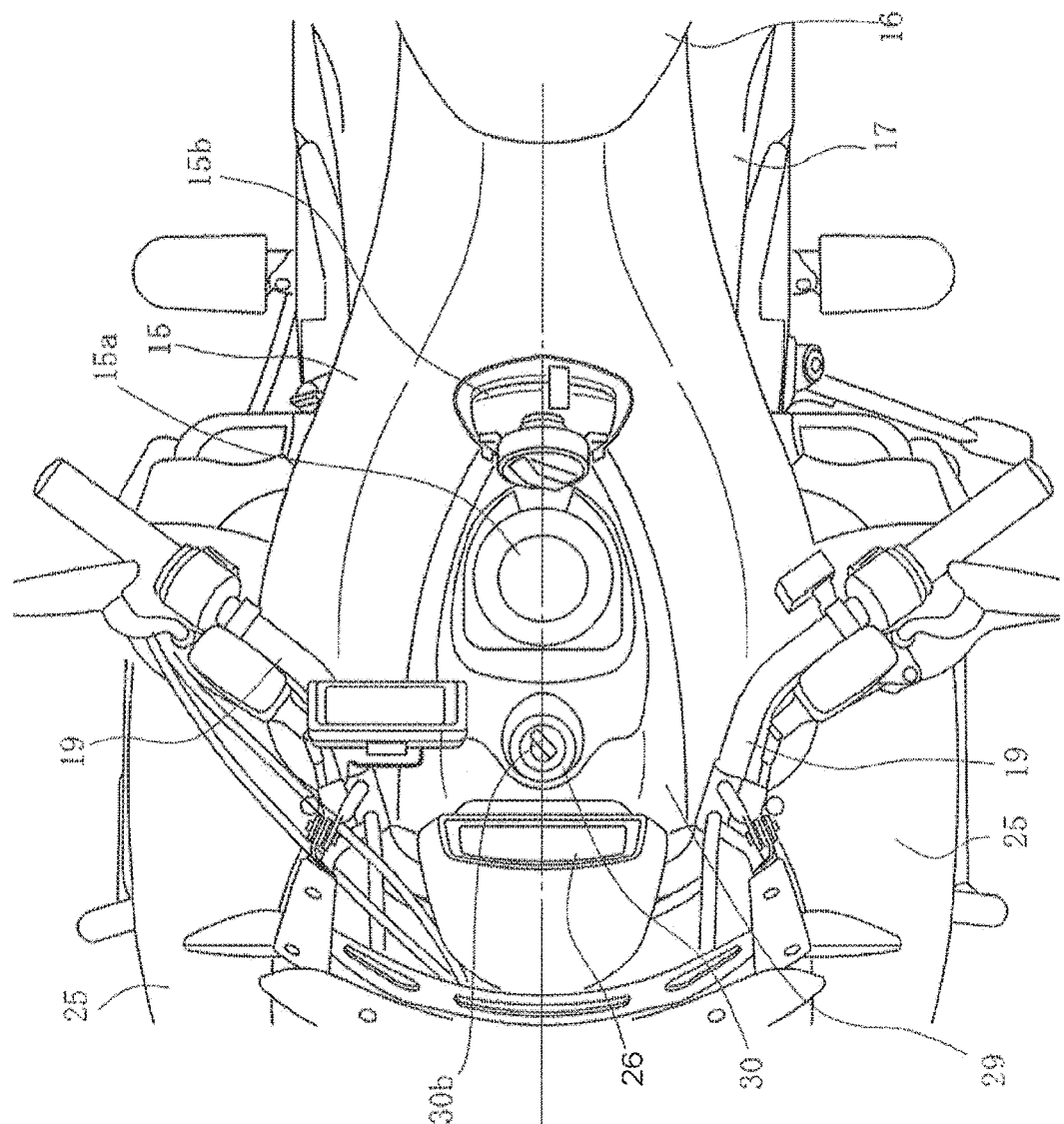
FIG. 2 is a plan view showing a fuel tank and an area around the fuel tank shown in FIG. 1.

Hereinafter, one embodiment is explained by reference to drawings. Firstly, the overall constitution of a vehicle is schematically explained by reference to FIG. 1. In this specification, the directions such as frontward and rearward, upward and downward, and leftward and rightward are determined based on respective directions of the vehicle. In FIG. 1, a front side of the vehicle is indicated by an arrow F, and an upper side of the vehicle is indicated by an arrow UP. In FIG. 2, a left side of the vehicle is indicated by an arrow L, and a right side of the vehicle is indicated by an arrow R.

A motorcycle shown in FIG. 1 is a big motorcycle where a horizontally-opposed cylinder engine 11 is supported on a lower side of a vehicle body frame 10 at the center of a vehicle body, and a front wheel 12 and a rear wheel 13 are arranged in front of and behind the vehicle body frame 10 respectively. The engine 11 is a water-cooled engine, and radiators 14 are arranged above a cylinder head 11a of the engine 11. Although not clearly described in FIG. 1, the radiators 14 are arranged on left and right sides of the vehicle body, respectively.

A fuel tank 15 is supported on the vehicle body frame 10 above the engine 11. A front portion of the fuel tank 15 overlaps with inner sides of the radiator 14 as viewed in a side view. A tandem seat 16 is arranged behind the fuel tank 15, and is supported on seat rails described later, and a pillion seat is positioned above the rear wheel 13.

A front end of a rider's seat, which constitutes a front portion of the seat 16, overlaps with an upper surface of a rear portion of the fuel tank 15.

A lower portion of a rear portion of the fuel tank 15 and a lower portion of the rider's seat of the seat 16 are covered with side covers 17 (corresponding to the vehicle body cover of the invention). Each side cover 17 covers a side surface of the vehicle body in such a manner that the side cover 17 extends from a lower edge of the seat 16 to a lower edge of the fuel tank 15, and these lower edges and upper edges of a main frame 32 and a center frame 34 (both described later) which constitute the vehicle body frame 10 are connected to each other by a downwardly spreading surface.

Although not shown in the drawing, legs of a rider extend frontward from the seat 16, and are bent and extend downwardly from an area in the vicinity of the rear portion of the fuel tank 15. Thighs of the legs extend frontward toward side surfaces of the rear portions of the fuel tank 15 from the seat 16, and are brought into contact with front surfaces of the side covers 17 and the side surfaces of the rear portions of the fuel tank 15. The rider can perform knee-gripping by clamping such portions with his thighs. The downwardly spreading surface of the side cover 17 has a shape which conforms to the thigh.

Numeral 18 indicates a front fork. The front fork 18 is provided as left and right front forks, and the front wheel 12 is supported on lower end portions of the front forks 18. Numeral 19 indicates a handle bar, and the handle bar 19 steers the front wheel 12 by rotating the front forks 18. Numeral 20 indicates a head light, and numeral 21 indicates a head light cowl. A duct 22 is integrally formed on left and right sides of the head light cowl 21 respectively (only left duct 22 shown in the drawing), and introducing openings 23 are formed on front surfaces of the ducts 22 in a state where the introducing openings 23 are directed in the frontward direction. The ducts 22 are integrally formed with a fork cover 24 that covers an upper portion of the front forks 18.

Numeral 25 indicates radiator shrouds, and the radiator shrouds 25 cover front portions and upper portions of the radiators 14 in an approximately inverted L-shape as viewed in a side view. Upper portions of the radiator shrouds 25 extend in the rearward and approximately horizontal direction, and covers side surfaces of a front lower portion of the fuel tank 15. Numeral 26 indicates a meter.

The engine 11 takes in air from an air cleaner, described later, which is arranged below the fuel tank 15, and discharges air from a muffler 27, which is arranged on one side of the rear wheel 13 approximately horizontally. The rear wheel 13 is driven by the engine 11 via a shaft. A swing arm (not shown in the drawing), which supports the rear wheel 13 on a rear end thereof, is swingably supported on the vehicle body frame 10 by a pivot 28.

FIG. 2 is a plan view showing the fuel tank 15 and an area around the fuel tank 15 shown in FIG. 1. A front portion of the fuel tank 15 expands in the lateral direction and a width of a rear portion of the fuel tank 15 is narrowed, thus providing the fuel tank 15 with a shape that enables a rider to perform knee-gripping. A garnish 29 extending in the longitudinal direction of the vehicle is mounted on a center portion of the front portion of the fuel tank 15, which has a large width, in such a manner that the garnish 29 surrounds a filling port 15a, and a key cylinder 30 is mounted on a portion of the front portion of the fuel tank 15 in front of the filling port 15a.

Figure 4:
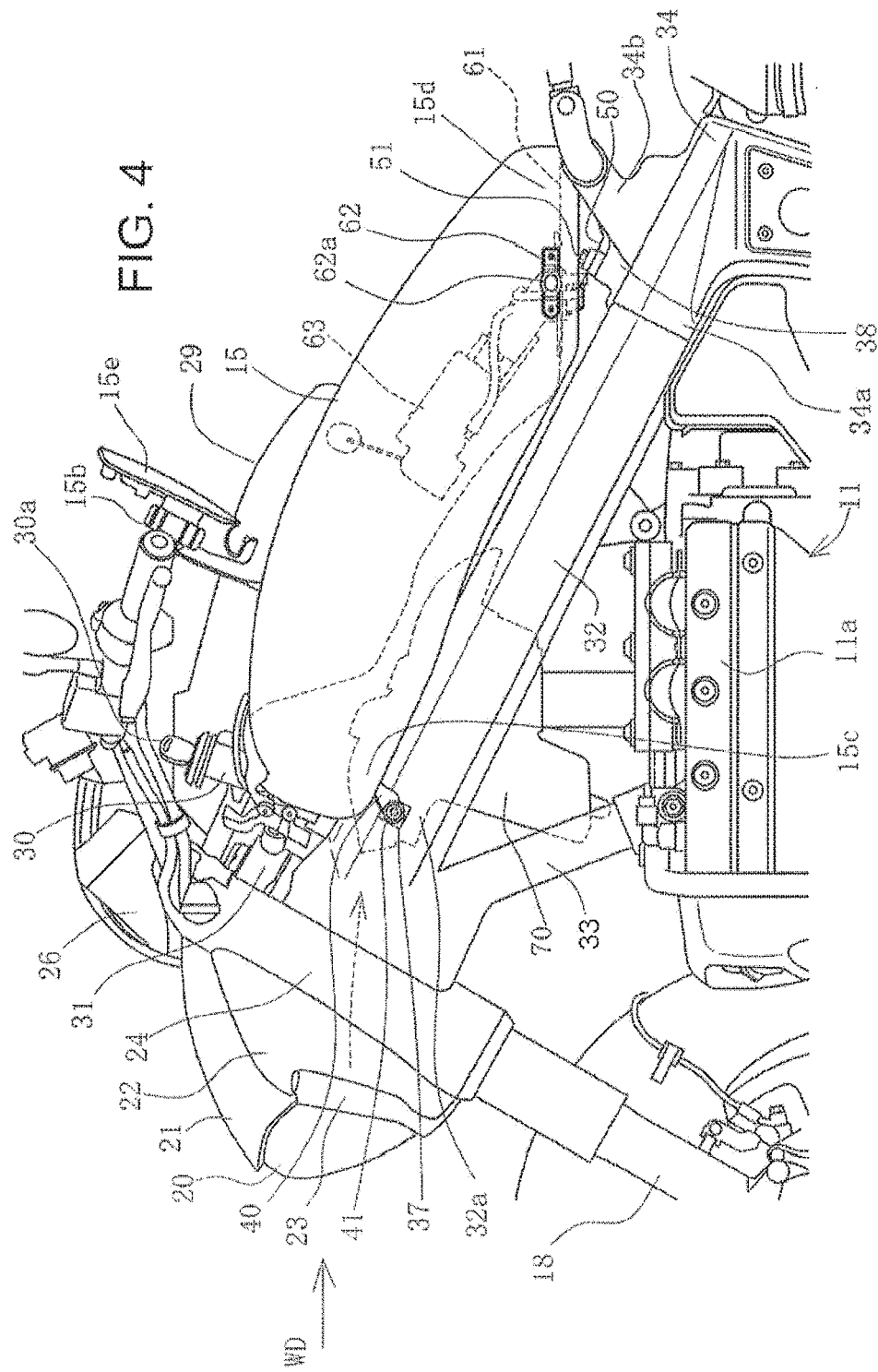
FIG. 4 is a view showing the fuel tank and an area around the fuel tank shown in FIG. 1 in a state where some parts are omitted.

The key cylinder 30 is a main switch for starting or stopping the engine 11, and also functions as a handle lock. The filling port 15a is opened or closed by a cap 15b. FIG. 2 and FIG. 4 respectively show a state where a lid 15e is opened and the removed cap 15b is temporarily placed on a back side of the lid 15e.

The key cylinder 30 is positioned at a front end portion of the fuel tank 15, and is arranged at a position where a rider's hand can easily reach the key cylinder 30 in a state where the rider is seated on the seat 16. The meter 26 is positioned in front of the key cylinder 30, and the meter 26, the key cylinder 30 and the filling port 15a are aligned with each other on the center line CT of the vehicle body.

Figure 3:
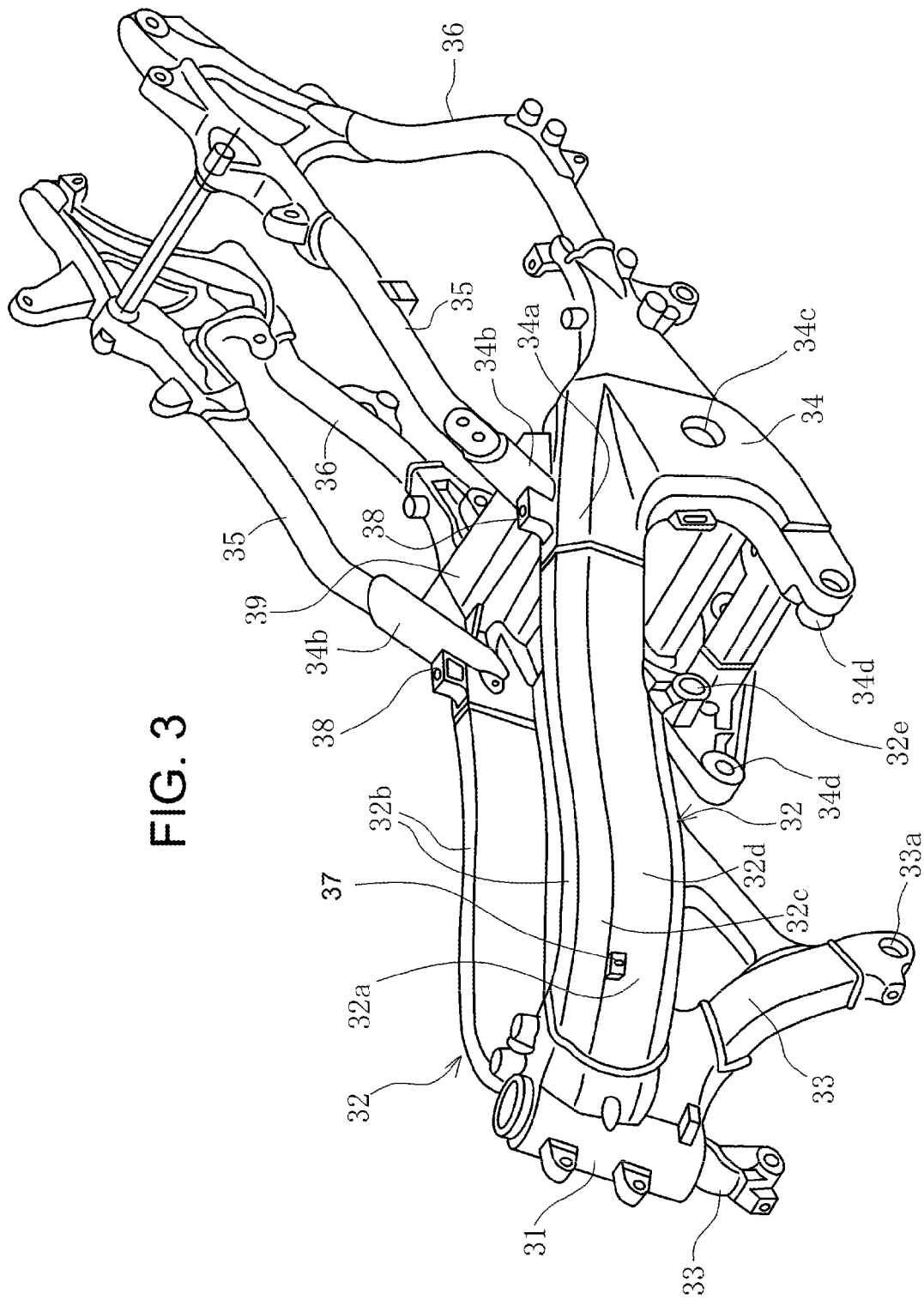
FIG. 3 is a perspective view of a vehicle body frame.

FIG. 3 is a perspective view showing the vehicle body frame 10. The vehicle body frame 10 includes: main frames 32 that extend obliquely downward and rearward in a laterally bifurcated manner from the head pipe 31 mounted on a front end portion of the vehicle body frame 10; down frames 33 that extend obliquely downward and rearward from the head pipe 31 in the same manner as the main frames 32 at a steeper angle than the main frame 32; center frames 34 that are joined by welding to rear end portions of the main frames 32; seat rails 35 that extend obliquely upward and rearward from upper portions of the center frames 34; and rear frames 36 that connect rear portions of the center frames 34 and rear ends of the seat rails 35 to each other.

The respective members, which constitute the vehicle body frame 10, are made of metal such as an aluminum alloy, and each member is formed as a left and right members except for the head pipe 31. The head pipe 31, the main frames 32, the down frames 33, the seat rails 35 and the rear frames 36 have the hollow pipe structure, respectively.

Tank-front-side mounting bosses 37 are spaced from upper surfaces 32b of the main frames 32 and formed on side surfaces 32d of front end bent portions 32a. The front end bent portions 32a are formed on front portions 32c of the main frames 32, respectively, in a state where the tank-front-side mounting bosses 37 are bent toward the head pipe 31. Tank-rear-side mounting bosses 38 are formed on upper surfaces of upper front ends 34a of the center frames 34, respectively.

Joint portions 34b, which project obliquely upward and to which front end portions of the seat rails 35 are connected, are integrally formed with the center frames 34 in the vicinity of the tank-rear-side mounting bosses 38. Rear portions of the joint portions 34b of the left and right center frames 34 are connected to each other by a cross member 39. An upper end portion of a buffer for a rear wheel suspension (not shown) is supported on the cross member 39.

The left and right tank-rear-side mounting bosses 38 are arranged in front of the cross member 39, and a member that traverses in the vehicle width direction like the cross member is not provided between the left and right tank-rear-side mounting bosses 38.

Numeral 34c indicates pivot holes, and the pivot 28 (FIG. 1) is inserted into the pivot holes 34c.

The engine 11 is supported by bosses 33a formed on lower end portions of the down frames 33, bosses 32e formed on intermediate portions of the main frames 32 in the longitudinal direction of the vehicle, and bosses 34d formed on front ends of lower portions of the center frames 34.

Next, the structure of the fuel tank 15 and an area around the fuel tank 15 is explained.

FIG. 4 shows the fuel tank 15 and an area around the fuel tank 15 shown in FIG. 1 in a state where the radiators 14, the radiator shrouds 25 and the side covers 17 are omitted.

The fuel tank 15 is arranged in an extending manner in the longitudinal direction of the vehicle obliquely upward and frontward along the inclination of the main frame 32 as viewed in a side view. A front portion and a rear portion of the fuel tank 15 are fastened to the main frame 32 and the center frame 34, respectively. The front lower portion 15c of the fuel tank 15 overlaps with outer sides of the front end bent portions 32a of the main frames 32. Lower end portions of tank front stays 40 (corresponding to the front side connecting members of the invention), which extend obliquely downward and frontward from a bottom portion of the fuel tank 15, are made to overlap with the tank-front-side mounting bosses 37, and are fastened to the main frames 32 using bolts 41 from lateral sides of the vehicle.

A rear lower portion 15d of the fuel tank 15 is fastened to the tank-rear-side mounting bosses 38 in such a manner that a tank rear stay 50, which extends downward from the bottom surface of the rear lower portion 15d of the fuel tank 15, is made to overlap with and is fastened to the tank-rear-side mounting bosses 38 using bolts 51 from above.

With respect to the bottom surface 60 of the fuel tank 15, the bottom surface of the rear lower portion 15d constitutes the bottom surface of the rear lower portion of the fuel tank 15 of the invention, and an approximately horizontal pump mounting seat surface 61 is formed on such a bottom surface. The tank rear stay 50 projects sideward from the pump mounting seat surface 61, and is fastened to the tank-rear-side mounting bosses 38 using the bolts 51 from above. The tank-rear-side mounting bosses 38 are positioned below the pump mounting seat surface 61. The joint portions 34b are also formed in an upwardly projecting manner while expanding laterally outward from lower portions thereof so as to avoid the pump mounting seat surface 61.

Side cover mounting brackets 62 are mounted on side surfaces of the rear lower portion 15d. Engaging projections (not shown), which are formed on inner surfaces of the upper portions of the front ends of the side covers 17 in an inwardly projecting manner, are detachably engaged with elongated holes 62a, which are formed in center portions of the side cover mounting brackets 62, and extend in the longitudinal direction of the vehicle. These engaging portions adopt the mount rubber structure where the engaging projection is engaged with the elongated hole 62a by way of a cylindrical rubber.

A portion of the bottom surface 60 in front of the pump mounting seat surface 61 has an upwardly inclined bottom shape, which is inclined at a steep angle toward the filling port 15a formed in the front portion of the fuel tank 15. A fuel pump 63 is incorporated in the fuel tank 15 such that the fuel pump 63 obliquely extends in the longitudinal direction of the vehicle along the bottom surface 60. A lower (rear) end portion of the fuel pump 63 is mounted on the pump mounting seat surface 61.

The ducts 22 are arranged so as to overlap with outer sides of the head pipe 31. A traveling wind WD, which is taken into the ducts 22 through the introducing openings 23, passes along inner sides of the front forks 18 and is supplied to a front side of the front lower portion 15c of the fuel tank 15 and an upper side of the cylinder head 11a.

Figure 5:
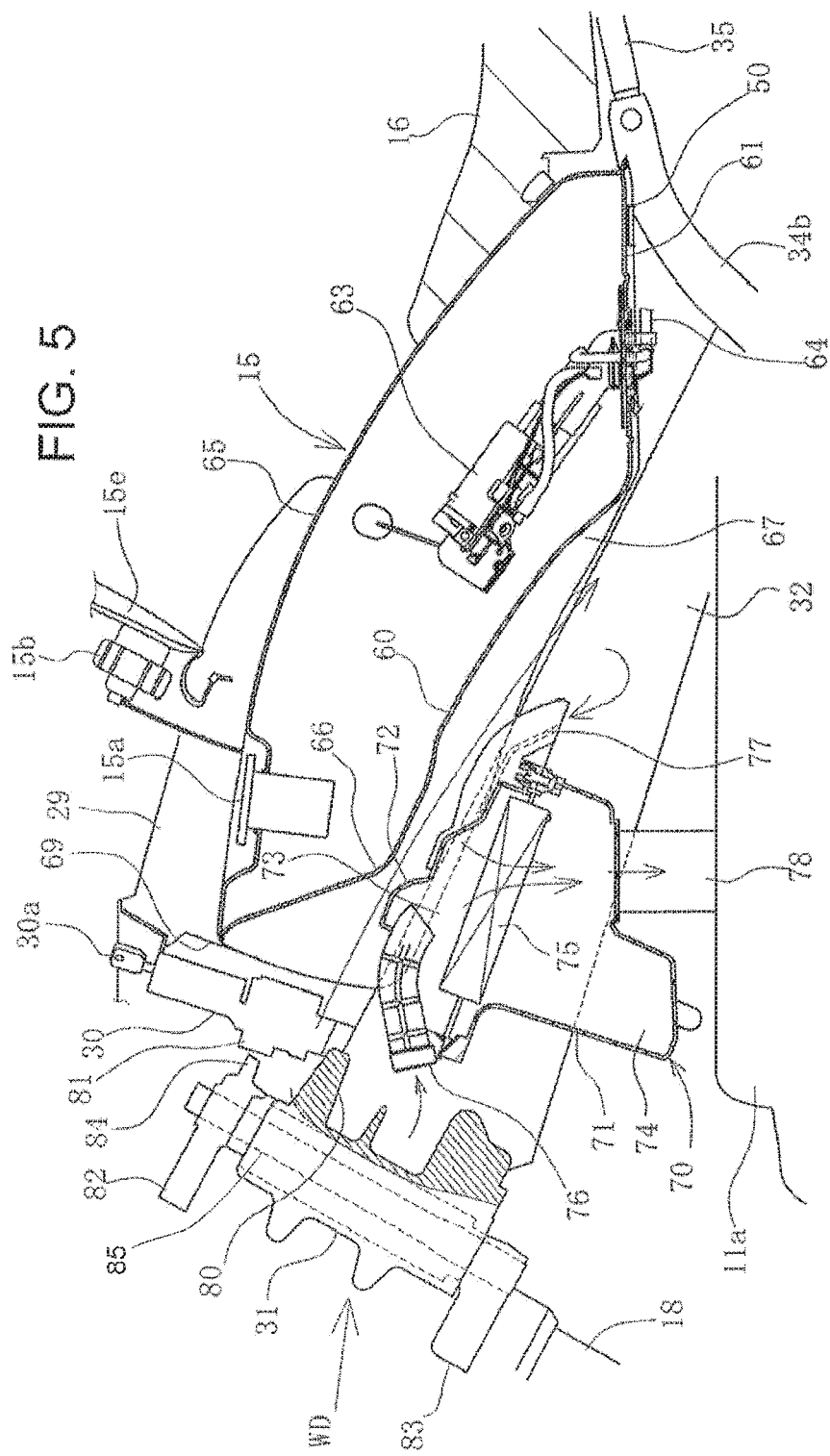
FIG. 5 is a cross-sectional view of a portion of the vehicle corresponding to FIG. 4 taken along a line which passes a center line of a vehicle body.

FIG. 5 is a cross-sectional view showing a portion of the vehicle corresponding to FIG. 4 taken along a line that passes the center line CT of a vehicle body.

A large gap is formed between a front portion of the bottom surface 60 of the fuel tank 15 and the main frame 32, and an air cleaner 70 is arranged below the fuel tank 15 by making use of the gap.

The air cleaner 70 is housed in a space formed between a rear side of the head pipe 31 and the left and right main frames 32 and above the cylinder head 11a. The air cleaner 70 includes: a cleaner casing 71, which forms a lower side of the air cleaner 70; a cleaner cover 72, which forms an upper side of the air cleaner 70; and an air filter 75, which partitions the inside of the air cleaner 70 into a dirty side 73 and a clean side 74. A front duct 76, which extends obliquely downward and frontward, is formed on the cleaner cover 72. The front duct 76 takes in a traveling wind WD from behind the head pipe 31, and introduces the traveling wind WD into the dirty side 73.

A rear duct 77, which takes in air from a space behind the cleaner cover 72 toward the dirty side 73, is also provided to a rear portion of the cleaner cover 72.

The cleaner casing 71 is arranged in a rearwardly inclined posture in conformity with the inclination of the bottom surface 60, and the cleaner casing 71 opens at a position lower than the front duct 76.

Air that enters the dirty side 73 is filtered by the air filter 75 and enters the clean side 74. Then, air is taken in an intake port of the cylinder head 11a by way of an intake pipe 78 connected to a bottom portion of the cleaner casing 71.

The bottom surface 60 of the fuel tank 15 is inclined obliquely upward and frontward and hence, the bottom surface 60 of the fuel tank 15 functions as a guide portion that guides a traveling wind WD introduced through the introducing opening 23 toward an area around the cleaner casing 71 and toward the rear lower portion 15d side behind the cleaner casing 71. The bottom surface 60 has a guide shape. Due to such a constitution, it is possible to supply a large amount of cold traveling wind WD to the front duct 76 and the rear duct 77 and, at the same time, it is also possible to cool the fuel tank 15 per se and hence, a relatively cooled fuel can be supplied to the cylinder head 11a whereby the power performance of the engine can be enhanced.

The key cylinder 30 mounted on the front end portion of the fuel tank 15 is arranged in a vertically elongated manner in a state where an upper side of the key cylinder 30 is rearwardly inclined.

The key cylinder 30 is supported on a projecting portion 80 that rearwardly extends toward an upper portion of the head pipe 31, and a lock portion 81 is configured to be engaged with or disengaged from a stopper portion 84 formed on a top bridge 82 when a key 30a is operated. The key 30a is inserted into a key hole 30b (FIG. 2) formed in an upper end surface of the key cylinder 30 from above, and the lock portion 81 is advanced or retracted in response to the rotation of the key 30a. The stopper portion 84 is rotated integrally with the handle bar 19 and hence, when the rotation of the stopper portion 84 is restricted by the lock portion 81, the handle bar 19 is brought into a non-rotatable state whereby a handle lock state is established.

A front portion of the top bridge 82, together with a front portion of the bottom bridge 83, connects upper portions of the front forks 18 with each other. A rear portion of the top bridge 82 and a rear portion of the bottom bridge 83 are made to overlap with an upper portion and a lower portion of the head pipe 31 and are rotatably connected to the head pipe 31 by the steering shaft 85.

The pump mounting seat surface 61 forms an approximately triangular space as viewed in a side view together with an upper portion of the center frame 34 and the joint portion 34b. A pipe 64 of the fuel pump 63 is arranged in the space and below the pump mounting seat surface 61.

The pipe 64 of the fuel pump 63 and wiring extend downward from the pump mounting seat surface 61. There is neither a cross member for mounting nor a shaft for mounting that traverses in the lateral direction below the pump mounting seat surface 61 and, hence, the pump mounting seat surface 61 can be arranged at a lower position and thereby contributes to lowering of the center of gravity of the vehicle.

Figure 6:
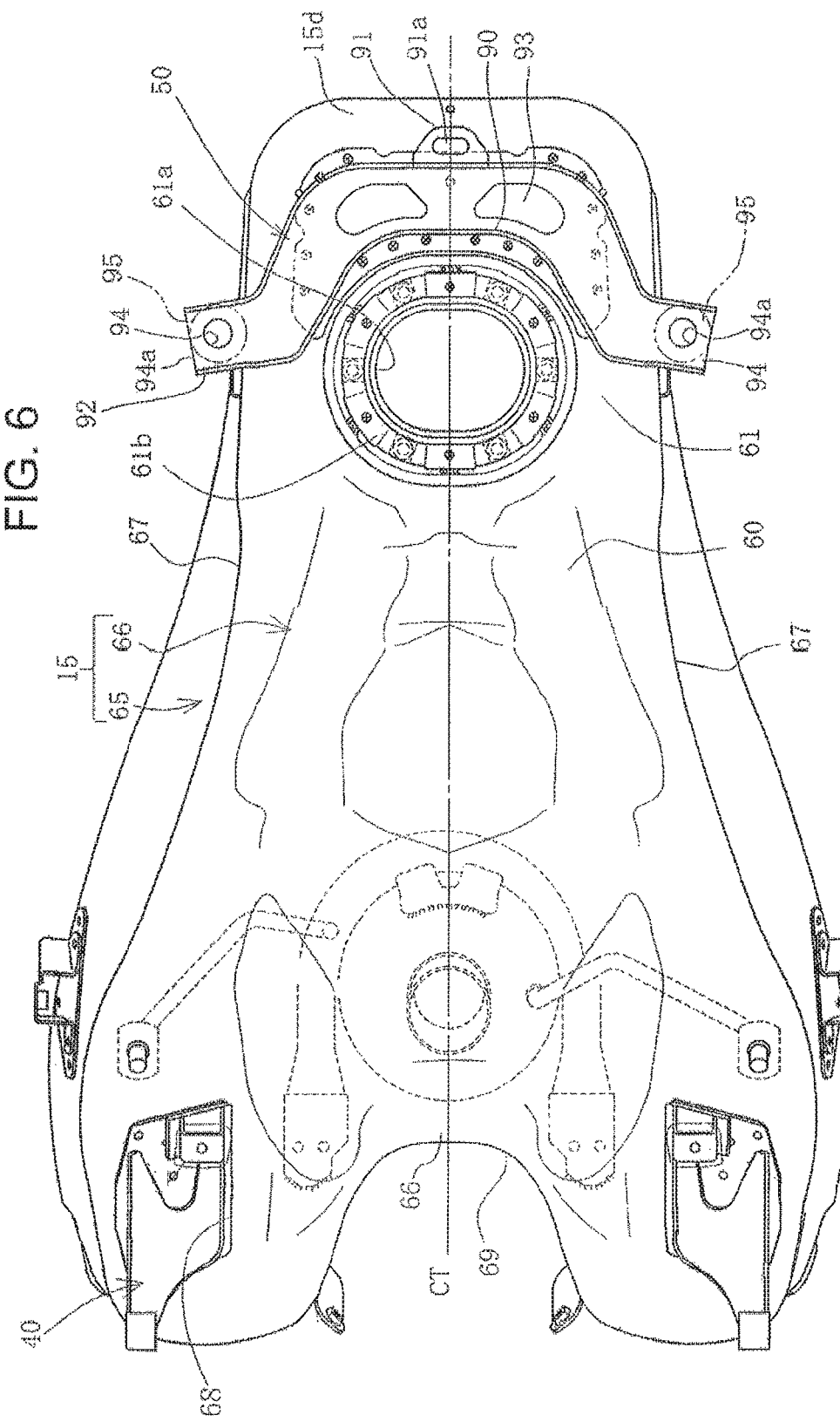
FIG. 6 is a bottom plan view of the fuel tank.

Next, the mounting structure of the front portion of the fuel tank 15 is explained in detail. FIG. 6 is a bottom plan view of the fuel tank 15. The fuel tank 15 is a hollow body formed by joining an outer member 65, which forms an upper surface side of the fuel tank 15, and an inner member 66, which forms a bottom surface side of the fuel tank 15, in an opposedly facing manner, wherein the periphery of the outer member 65 and the periphery of the inner member 66 are integrally joined to each other by welding using a flange 67. The flange 67 has a vertical flange shape that projects downward.

Mounting seats 68 for mounting the tank front stays 40 are formed on left and right front end portions of the bottom surface 60, and the tank front stays 40 are integrally formed with the mounting seats 68 by welding. A center portion of the fuel tank 15 between the left and right mounting seats 68 is indented in a bent shape toward a rear side from a front side in the longitudinal direction of the vehicle thus forming a recessed portion 69. The key cylinder 30 is arranged in the inside of the recessed portion 69.

A pump mounting seat 61b is formed on the pump mounting seat surface 61 in such a manner that the pump mounting seat 61b surrounds a pump insertion hole 61a formed in a center portion of the pump mounting seat surface 61 in the vehicle width direction. The fuel pump 63 is inserted into the fuel tank 15 through the pump insertion hole 61a, and a bottom portion of the fuel pump 63 is fixed to the pump mounting seat 61b by fastening using bolts.

The tank rear stay 50 is also welded to the pump mounting seat surface 61 behind the pump mounting seat 61b, and is arranged in an extending manner in the vehicle width direction.

The tank rear stay 50 is an approximately strip-like plate-shaped member elongated in the vehicle width direction. The tank rear stay 50 is bent such that a longitudinally intermediate portion of the tank rear stay 50 projects rearward, thus forming an escape portion 90 for the pump mounting seat 61b. The escape portion 90 is welded while surrounding a rear half portion side of the pump mounting seat 61b. Although welding is one example of a fixing means, the fixing means is not limited to welding and other fixing means can be also used. A projecting portion 91 that projects rearward is formed on the escape portion 90, and an elongated hole 91a is formed in the projecting portion 91.

Figure 8:
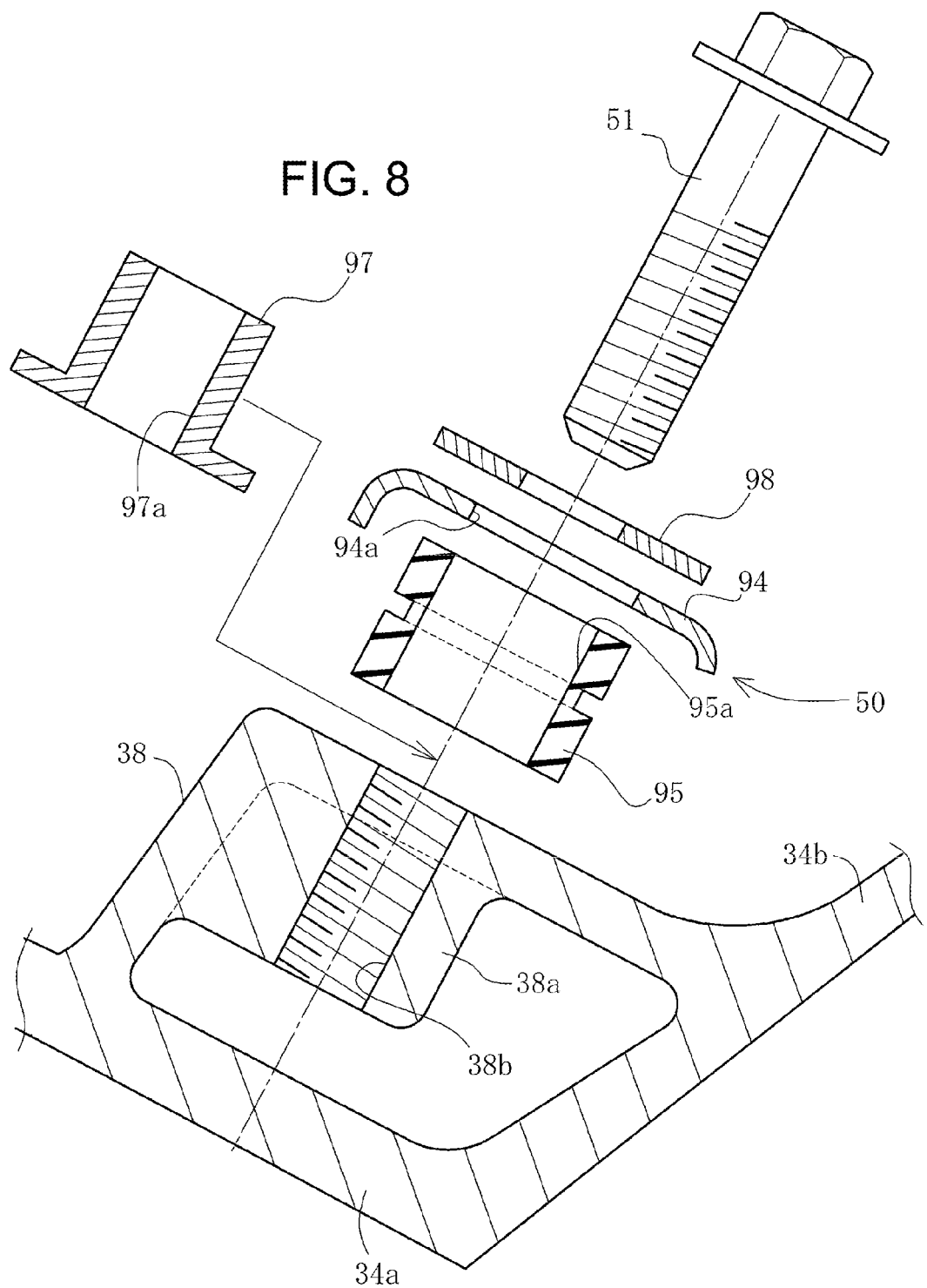
FIG. 8 is a view showing the mounting of a rear stay.

The tank rear stay 50 is formed into an approximately U shape in cross section by bending front and rear edge portions of the tank rear stay 50 upward, thus forming flanges 92 (see FIG. 8). Numeral 93 indicates holes for decreasing weight.

Both end portions of the tank rear stay 50 in the length direction form mounting end portions 94, and project from an area on an approximately center portion side of the pump insertion hole 61a to outside of the rear lower portion 15d in the lateral direction. A rubber mounting hole 94a is formed in the mounting end portion 94, and a mount rubber 95 described later (FIG. 8) is mounted.

Figure 7:
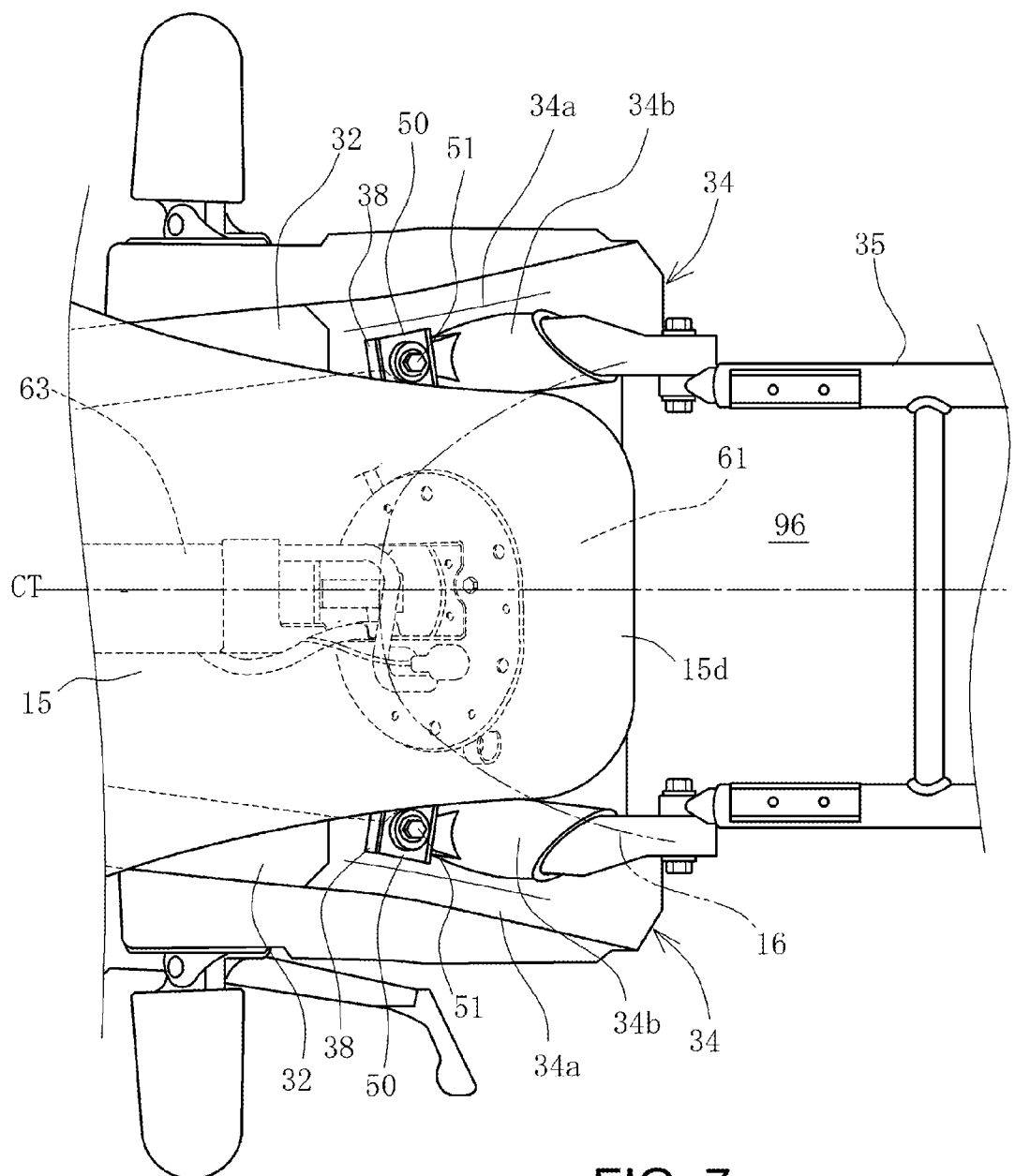
FIG. 7 is a view showing the fuel tank and an area around the fuel tank in FIG. 2 in a state where a seat and side covers are removed.

FIG. 7 shows a rear end portion of the fuel tank 15 and an area around rear end portion of the fuel tank 15 shown in FIG. 2 in a state where the seat 16 and the side cover 17 are removed.

The rear lower portion 15d overlaps with a lower side of the seat 16, and has a width thereof in the vehicle width direction narrowed so that the rear lower portion 15d is disposed inside the left and right joint portions 34b. The tank rear stay 50 projects sideward from both sides of the rear lower portion 15d.

The tank rear stay 50 is positioned outside the rear lower portion 15d and, hence, the tank rear stay 50 does not overlap with the rear lower portion 15d whereby the bolts 51 can be easily fastened from above. By removing the side covers 17, the tank rear stay 50 and the bolts 51 are exposed so that the mounting or removing operation of the bolts 51 can be performed.

A space, which is sandwiched between the left and right seat rails 35, is formed behind the rear lower portion 15d, and the space is used as an article storage part 96 such as a brief case. By not providing a mounting cross member behind the rear end portion of the fuel tank 15, it is possible to arrange the article storage part 96 behind the rear end portion of the fuel tank 15. The article storage part 96 opens upward and is covered with the seat 16.

Next, the structure for mounting the rear portion of the fuel tank 15 is explained in detail. As shown in FIG. 8, the mount rubber 95 is mounted in the rubber mounting hole 94a formed in the mounting end portion 94 of the tank rear stay 50 in advance. A flange equipped collar 97 is fitted into a shaft hole 95a formed in the mount rubber 95.

By placing the fuel tank 15 on the main frames 32 in such a state, the mounting end portions 94 overlap with the tank rear mounting bosses 38 from above. Nut holes 38b formed in the tank rear mounting bosses 38 and the shaft holes 97a formed in the flange equipped collars 97 are aligned with each other, and the fuel tank 15 is fastened to the main frames 32 by the bolts 51 from above by way of washers 98.

Accordingly, the tank rear stay 50 is mounted on the tank rear mounting bosses 38 by way of the rubbers.

In the above-mentioned structure, a seat surface (upper surface) of the tank rear mounting boss 38 is inclined rearward, and the bolt 51 is fastened from an rear upper oblique position such that the bolt 51 is inclined orthogonal to an inclined surface and hence, the bolt 51 can be fastened without interfering with the fuel tank 15. In a state before the side cover 17 and the seat 16 are mounted, the tank rear mounting boss 38 is exposed from the rear lower portion 15d sideward and hence, an operator can perform a fastening operation while aligning the shaft hole 97a formed in the flange equipped collar 97 with the nut hole 38b formed in the tank rear mounting boss 38 with his naked eye.

The center frames 34 are formed by casting or forging, and the tank rear mounting bosses 38 are integrally formed with upper front ends 34a of the center frames 34. Here, the nut portions 38a and the nut holes 38b are also formed together with the tank rear mounting bosses 38. However, the tank rear mounting bosses 38 may not be always integrally formed with the upper front ends 34a of the center frames 34, and a member that is made of sheet metal or the like may be mounted as a separate body on the upper end portion 34a of the center frame 34 or the rear end of the main frame 32 by welding or the like.

After mounting the respective left and right mounting end portions 94 of the tank rear stay 50 on the respective upper front ends 34a of the left and right center frame 34 in this manner, the seat 16 is mounted. Then, the front end portions of the side covers 17 are engaged with the side cover mounting brackets 62 mounted on the pump mounting seat surface 61 at side surfaces of the rear lower portion 15d so that each mounting portion of the mounting end portion 94, which includes the bolt 51, is covered with the side cover 17 whereby the mounting portion is not observed from the outside.

Further, in the case where the seat 16 is configured to be removable or rotatable via a hinge, when the seat 16 is rotated, the article storage part 96 is opened. Accordingly, it is possible to put an article into the article storage part 96 or to take out the article from the article storage part 96. The article storage part 96 is closed with the seat 16 by mounting the seat 16 or by closing the seat 16.

Next, the manner of operation of this embodiment is explained. As shown in FIG. 7, the rear stay (rear side connecting member) 50 extends leftward and rightward in the vehicle width direction from the pump mounting seat surface 61, which constitutes the rear portion of the bottom surface of the fuel tank, and the mounting end portions 94 at both end portions in the lateral direction are mounted on the upper front ends 34a of the left and right center frames 34. Accordingly, it is unnecessary to provide a cross member or a shaft, which has been conventionally provided only for mounting the fuel tank 15. As a result, even when a cross member for supporting a buffer is provided, the vehicle body frame can acquire appropriate rigidity. Further, even when the fuel pump 63 is incorporated into the fuel tank 15 and the fuel pump 63 is mounted on the pump mounting seat surface 61 of the fuel tank, there is no mounting member such as a shaft below the pump mounting seat surface 61 and, hence, the mounting of fuel pump 63 and the arrangement of the pipe 64 with respect to the fuel pump 63 below the pump mounting seat surface 61 are facilitated.

The tank rear stay 50 projects to the outside of the fuel tank 15 as viewed in a top plan view of the vehicle, and the tank rear stay 50 is made to overlap with and is fastened to the upper surfaces of the upper front ends 34a of the left and right center frames 34 by the bolts 51 from above. Accordingly, in mounting or removing the fuel tank 15, it is unnecessary for an operator to bend over or to look into the fuel tank 15. Further, a length of the bolt 51 can be shortened and, hence, the fastening is also simplified whereby the operability of the fastening operation is enhanced.

As shown in FIG. 6, the tank rear stay 50 is a laterally integral part, which is fixedly mounted on the pump mounting seat surface 61 by welding and, hence, strength of the tank rear stay 50 can be enhanced.

The tank rear stay 50 extends in such a manner that the tank rear stay 50 is routed around behind the pump mounting seat 61b formed on the pump mounting seat surface 61 and, hence, the tank rear stay 50 can reinforce the pump mounting seat 61b.

As shown in FIG. 1, the side cover (vehicle body cover) 17 extends from the lower edge of the seat 16 to the lower edge of the fuel tank 15 and covers an area ranging from these lower edges to the upper edges of the main frame 32 and the center frame 34, which constitute the vehicle body frame and, hence, the side cover 17 can cover the mounting portion of the tank rear stay 50 whereby the appearance of the vehicle can be enhanced.

Further, the lower edge of the seat 16 and the lower edge of the fuel tank 15 and the respective upper edges of the main frame 32 and the center frame 34 are connected to each other by the downwardly spreading surface of the side cover 17 and, hence, the side cover 17 conform to a shape of a thigh of a rider, which extends frontward from the seat 16, whereby steering property of the vehicle becomes easy.

The side covers 17 engage with the elongated holes 62a (FIG. 4) formed in the side cover mounting brackets 62 mounted on side surfaces of the fuel tank 15 in the vicinity of the tank rear stay 50 and, hence, the vehicle body frame is hardly deformed even when the vehicle body frame is gripped by legs of a rider.

The invention is not limited to the above-mentioned embodiment, and various modification and applications are conceivable within the principle of the invention. For example, the tank rear stay 50 may not be formed of a laterally integral body, and may be formed of left and right separate bodies. However, by forming the tank rear stay 50 as a laterally integral body as in the case of the embodiment, strength of the tank relay stay 50 can be enhanced and the number of parts can be decreased. Further, the bolts 51 may be replaced with fastening members of a different type.

DESCRIPTION OF REFERENCE NUMERALS

10: vehicle body frame
15: fuel tank
15d: rear lower portion
16: seat
32: main frame
34: center frame
35: seat rail
38: tank rear side mounting boss
50: rear stay
51: bolt
60: bottom surface
61: pump mounting seat surface
63: fuel pump
90: escape portion
94: mounting end portion
95: mount rubber
96: article storage part

What is claimed is:

1. A fuel tank mounting structure of a saddle-ride-type vehicle comprising:
   a vehicle body frame having a head pipe that steerably supports a front wheel, left and right main frames extending obliquely downward and rearward from the head pipe, and left and right center frames extending downward from rear ends of the left and right main frames;
   a fuel tank supported on the main frame; and
   a seat arranged behind the fuel tank, wherein
   the fuel tank is arranged in an elongated manner in a longitudinal direction of the vehicle, a rear lower portion of the fuel tank overlapping with a lower side of the seat,
   the fuel tank is mounted on the vehicle body frame by a front side connecting member and a rear side connecting member,
   the rear side connecting member extends leftward and rightward in a vehicle width direction from a bottom surface of the fuel tank, the rear side connecting member comprising end portions being positioned outside of the rear lower portion, and
   the end portions of the rear side connecting member in a length direction of the rear side connecting member project outwardly from side surfaces of the fuel tank as viewed in a top plan view of the vehicle so as not to overlap with the rear lower portion of the fuel tank and are mounted directly on the left and right main frames or the left and right center frames.

2. The fuel tank mounting structure of the saddle-ride-type vehicle according to claim 1, wherein the rear side connecting member overlaps with, and is fastened to, upper surfaces of the left and right main frames or upper surfaces of the left and right center frames from above.

3. The fuel tank mounting structure of the saddle-ride-type vehicle according to claim 2, wherein the rear side connecting member is a laterally integral part that is fixedly mounted on the bottom surface of a lower portion of the rear lower portion of the fuel tank.

4. The fuel tank mounting structure of the saddle-ride-type vehicle according to claim 3, wherein a pump mounting seat surface for mounting a fuel pump thereon is formed on the rear lower portion of the bottom surface of the fuel tank, and
   the rear side connecting member extends in such a manner that the rear side connecting member is routed around a rear side of the pump mounting seat surface.

5. The fuel tank mounting structure of the saddle-ride-type vehicle according to claim 2, further comprising a vehicle body cover that covers a side surface of the vehicle body frame in such a manner that the vehicle body cover extends from a lower edge of the seat to a lower edge of the fuel tank, and the lower edge of the seat and the lower edge of the fuel tank are connected to an upper edge of the vehicle body frame.

6. The fuel tank mounting structure of the saddle-ride-type vehicle according to claim 5, wherein the vehicle body cover engages with a side surface of the fuel tank in a vicinity of the rear side connecting member.

7. The fuel tank mounting structure of the saddle-ride-type vehicle according to claim 1, wherein the rear side connecting member is a laterally integral part that is fixedly mounted on the bottom surface of a lower portion of the rear lower portion of the fuel tank.

8. The fuel tank mounting structure of the saddle-ride-type vehicle according to claim 7, wherein a pump mounting seat surface for mounting a fuel pump thereon is formed on the rear lower portion of the bottom surface of the fuel tank, and
   the rear side connecting member extends in such a manner that the rear side connecting member is routed around a rear side of the pump mounting seat surface.

9. The fuel tank mounting structure of the saddle-ride-type vehicle according to claim 8, further comprising a vehicle body cover that covers a side surface of the vehicle body frame in such a manner that the vehicle body cover extends from a lower edge of the seat to a lower edge of the fuel tank, and the lower edge of the seat and the lower edge of the fuel tank are connected to an upper edge of the vehicle body frame.

10. The fuel tank mounting structure of the saddle-ride-type vehicle according to claim 9, wherein the vehicle body cover engages with a side surface of the fuel tank in a vicinity of the rear side connecting member.

11. The fuel tank mounting structure of the saddle-ride-type vehicle according to claim 7, further comprising a vehicle body cover that covers a side surface of the vehicle body frame in such a manner that the vehicle body cover extends from a lower edge of the seat to a lower edge of the fuel tank, and the lower edge of the seat and the lower edge of the fuel tank are connected to an upper edge of the vehicle body frame.

12. The fuel tank mounting structure of the saddle-ride-type vehicle according to claim 11, wherein the vehicle body cover engages with a side surface of the fuel tank in a vicinity of the rear side connecting member.

13. The fuel tank mounting structure of the saddle-ride-type vehicle according to claim 1, further comprising a vehicle body cover that covers a side surface of the vehicle body frame in such a manner that the vehicle body cover extends from a lower edge of the seat to a lower edge of the fuel tank, and the lower edge of the seat and the lower edge of the fuel tank are connected to an upper edge of the vehicle body frame.

14. The fuel tank mounting structure of the saddle-ride-type vehicle according to claim 13, wherein the vehicle body cover engages with a side surface of the fuel tank in a vicinity of the rear side connecting member.

15. A fuel tank mounting structure of a saddle-ride-type vehicle comprising:
   a vehicle body frame having a head pipe that steerably supports a front wheel, left and right main frames extending obliquely downward and rearward from the head pipe, and left and right center frames extending downward from rear ends of the left and right main frames;
   a fuel tank supported on the main frame;
   a seat arranged behind the fuel tank, wherein
   the fuel tank is arranged in an elongated manner in a longitudinal direction of the vehicle,
   the fuel tank is mounted on the vehicle body frame by a front side connecting member and a rear side connecting member,
   the rear side connecting member extends leftward and rightward in a vehicle width direction from a bottom surface of a lower portion of a rear portion of the fuel tank, and
   end portions of the rear side connecting member in a length direction of the rear side connecting member project outwardly from side surfaces of the fuel tank and as viewed in a top plan view of the vehicle and are mounted on the left and right main frames or the left and right center frames; and a pump mounting seat surface for mounting a fuel pump thereon is formed on the rear portion of the bottom surface of the fuel tank, wherein the rear side connecting member extends in such a manner that the rear side connecting member is routed around a rear side of the pump mounting seat surface with the end portions projecting from an area on an approximately center portion side of a pump insertion hole formed in the pump mounting seat surface.

16. The fuel tank mounting structure of the saddle-ride-type vehicle according to claim 15, wherein the rear side connecting member overlaps with, and is fastened to, upper surfaces of the left and right main frames or upper surfaces of the left and right center frames from above.

17. The fuel tank mounting structure of the saddle-ride-type vehicle according to claim 15, wherein the rear side connecting member is a laterally integral part that is fixedly mounted on the bottom surface of the lower portion of the rear portion of the fuel tank.

18. The fuel tank mounting structure of the saddle-ride-type vehicle according to claim 15, further comprising a vehicle body cover that covers a side surface of the vehicle body frame in such a manner that the vehicle body cover extends from a lower edge of the seat to a lower edge of the fuel tank, and the lower edge of the seat and the lower edge of the fuel tank are connected to an upper edge of the vehicle body frame.

* * * * *